(12) United States Patent
Crocker et al.

(10) Patent No.: US 9,021,369 B2
(45) Date of Patent: Apr. 28, 2015

(54) USER MATCHING IN A VIRTUAL ENVIRONMENT

(71) Applicant: Disney Enterprises, Inc., Burbank, CA (US)

(72) Inventors: John Crocker, Valencia, CA (US); Starr Long, Glendale, CA (US); Robert T. Ogrin, Santa Clarita, CA (US); Christian Shrigley, Simi Valley, CA (US)

(73) Assignee: Disney Enterprises, Inc., Burbank, CA (US)

( * ) Notice: Subject to any disclaimer, the term of this patent is extended or adjusted under 35 U.S.C. 154(b) by 184 days.

(21) Appl. No.: 13/736,436

(22) Filed: Jan. 8, 2013

(65) Prior Publication Data

US 2014/0195929 A1   Jul. 10, 2014

(51) Int. Cl.
*G06F 3/00* (2006.01)
*G06F 3/048* (2013.01)
*G06Q 50/00* (2012.01)

(52) U.S. Cl.
CPC ............... *G06F 3/048* (2013.01); *G06Q 50/01* (2013.01)

(58) Field of Classification Search
USPC .................................................. 715/751, 753
See application file for complete search history.

(56) References Cited

U.S. PATENT DOCUMENTS

| | | | | |
|---|---|---|---|---|
| 5,960,173 | A * | 9/1999 | Tang et al. ..................... | 709/201 |
| 7,823,074 | B2 * | 10/2010 | Takemura et al. ............ | 715/757 |
| 8,555,177 | B1 * | 10/2013 | Junee et al. ................... | 715/751 |
| 8,627,212 | B2 * | 1/2014 | Riley et al. .................... | 715/757 |
| 2008/0222535 | A1 * | 9/2008 | Zrike et al. .................... | 715/751 |
| 2008/0229215 | A1 * | 9/2008 | Baron et al. .................. | 715/751 |
| 2009/0328122 | A1 * | 12/2009 | Amento et al. ............... | 725/114 |
| 2010/0306672 | A1 * | 12/2010 | McEniry ........................ | 715/753 |
| 2011/0252319 | A1 * | 10/2011 | Garcia et al. .................. | 715/702 |
| 2012/0311504 | A1 * | 12/2012 | van Os et al. ................. | 715/853 |
| 2013/0254680 | A1 * | 9/2013 | Buhr et al. .................... | 715/753 |

* cited by examiner

*Primary Examiner* — Omar Abdul-Ali
(74) *Attorney, Agent, or Firm* — Patterson + Sheridan, LLP

(57) ABSTRACT

Techniques are disclosed to facilitate user matching in a virtual environment. Social interactions of a first user in the virtual environment are monitored. A request to participate in a desired activity is received from the first user. A set of users currently eligible to participate in the first desired activity is retrieved. A match is programmatically generated between the first user and at least a second user of the retrieved set of users, based on the monitored social interactions. The first user and the second user participate in the desired activity in the virtual environment.

20 Claims, 10 Drawing Sheets

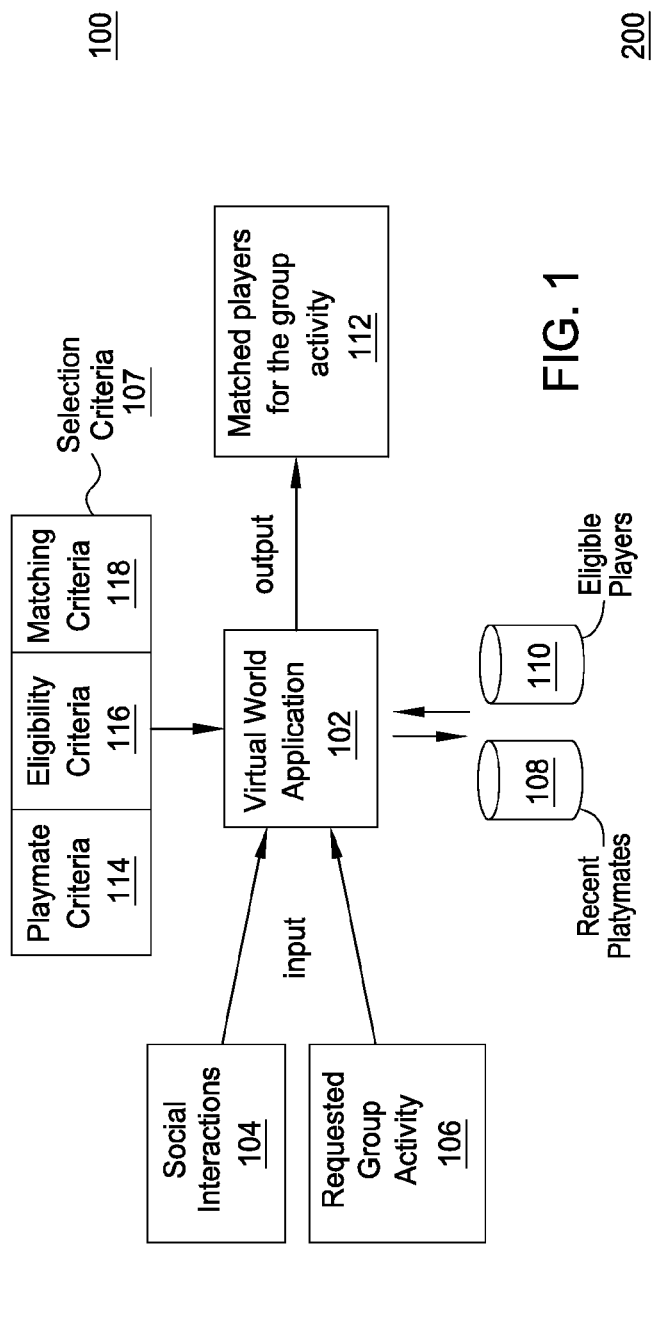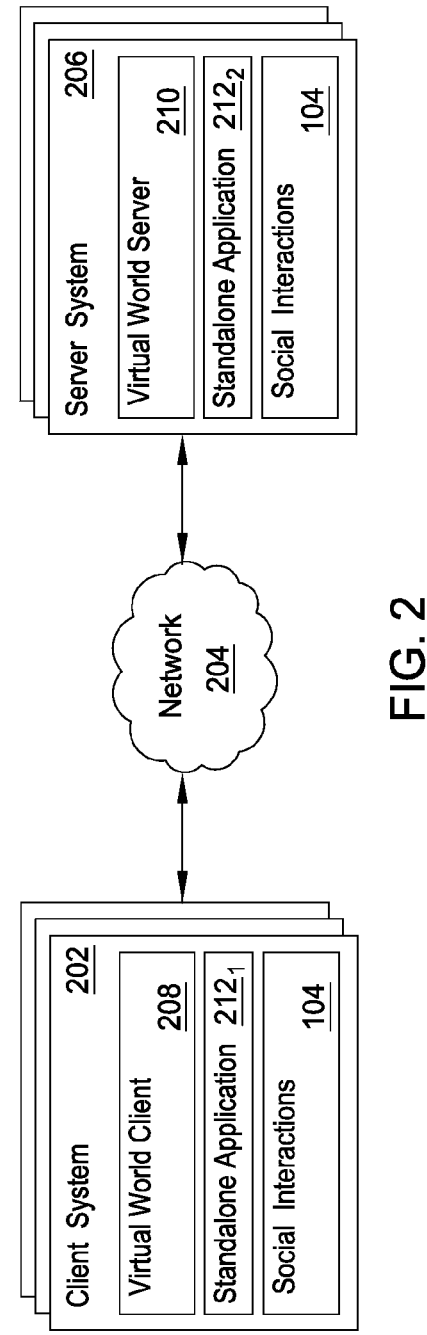

US 9,021,369 B2

USER MATCHING IN A VIRTUAL ENVIRONMENT

BACKGROUND

A virtual world is a simulated environment in which users may interact with virtual objects and locations of the virtual world. Each user may control a respective avatar through which the user may interact with other users' avatars in the virtual world. An avatar generally provides a graphical representation of an individual within the virtual world environment. Avatars are usually presented to other users as two or three-dimensional graphical representations that resembles a human individual. Frequently, virtual worlds allow multiple users to enter the virtual environment and interact with one another. Virtual worlds are said to provide an immersive environment, as they typically appear similar to the real world and objects tend to follow rules related to gravity, topography, locomotion, physics and kinematics. Of course, virtual worlds can suspend or alter these rules as well as provide other imaginative or fanciful environments. Users typically communicate with one another through their avatars using text messages sent between avatars, real-time voice communication, gestures displayed by avatars, symbols visible in the virtual world, and the like.

Some virtual worlds are described as being persistent. A persistent world provides an immersive environment (e.g., a fantasy setting used as a setting for a role-playing game, or a virtual world complete with land, buildings, towns, and economies) that is generally always available and where events continue to occur regardless of the presence of a given avatar. Thus, unlike more conventional online games or multi-user environments, the virtual world continues to exist and plots and events continue to unfold as users enter (and exit) the virtual world. Virtual environments are presented as images on a display screen and some virtual environment may allow users to record events that occur within the virtual environment.

SUMMARY

Embodiments presented in this disclosure provide a method, computer-readable medium, and system for performing an operation of user matching based on social interactions in a virtual environment. The operation includes monitoring social interactions of a first user in the virtual environment. The operation also includes receiving, from the first user, a request to participate in a first desired activity in the virtual environment. The operation also includes accessing a set of users, other than the first user, currently eligible to participate in the first desired activity. The operation also includes programmatically generating a match between the first user and at least a second user of the accessed set of users, based on the monitored social interactions of the first user. The first user and the second user participate in the first desired activity in the virtual environment based on the generated match.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

So that the manner in which the above recited features, advantages and objects of embodiments presented in this disclosure are attained and can be understood in detail, a more particular description of the embodiments, briefly summarized above, may be had by reference to the embodiments thereof which are illustrated in the appended drawings.

It is to be noted, however, that the appended drawings illustrate only typical embodiments disclosed herein and are therefore not to be considered limiting of its scope, for the disclosure may admit to other equally effective embodiments.

FIG. 1 is a data flow diagram illustrating an application configured to facilitate player matching in a virtual environment, according to one embodiment presented in this disclosure.

FIG. 2 is a block diagram illustrating a networked system configured to facilitate player matching in the virtual environment, according to one embodiment presented in this disclosure.

Figure 3:
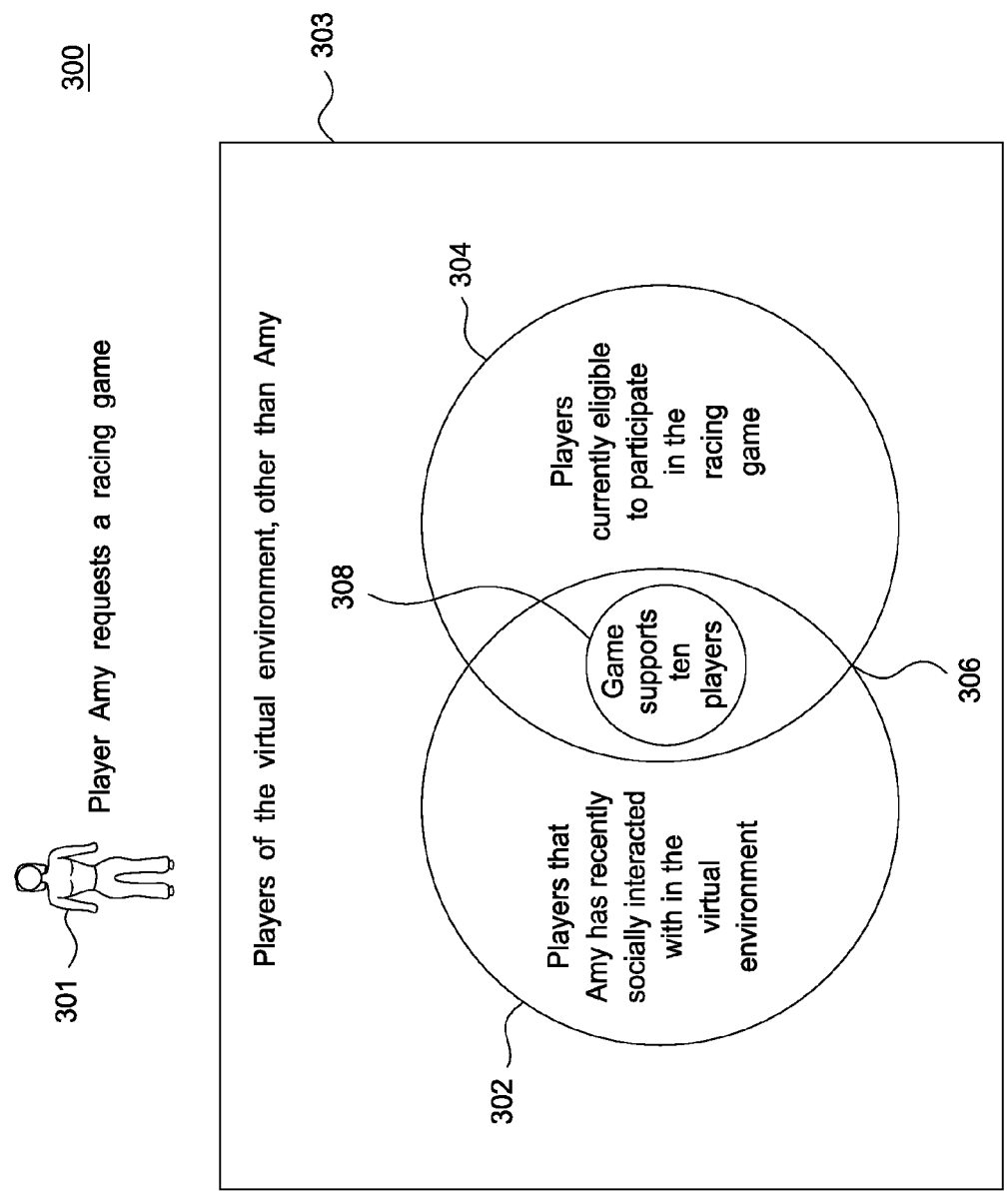

FIG. 3 is a set diagram representing matched players in the virtual environment, according to one embodiment presented in this disclosure.

Figure 4:
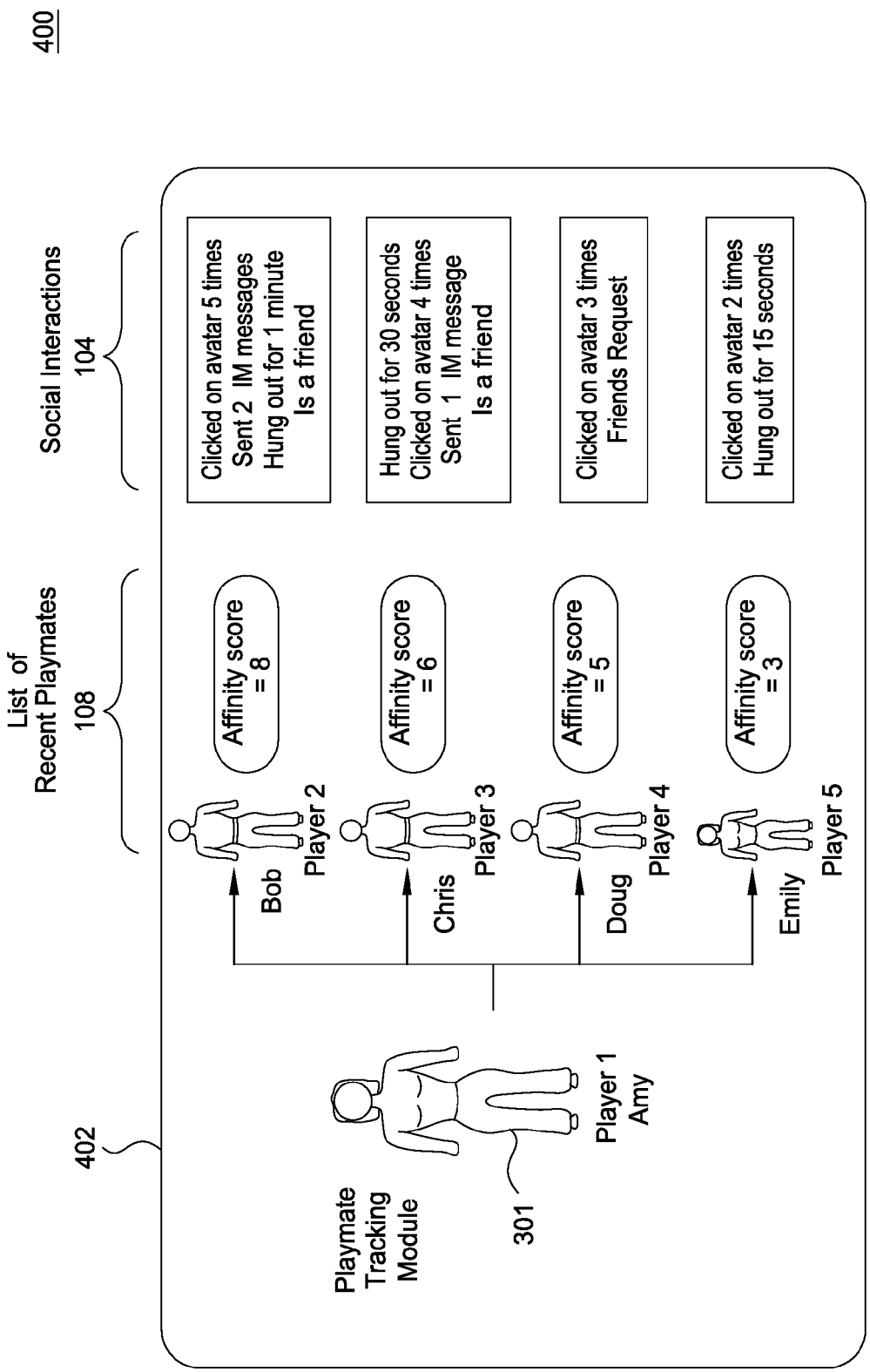

FIG. 4 is a diagram depicting determination of recent playmates of a requesting user, according to one embodiment presented in this disclosure.

Figure 5:
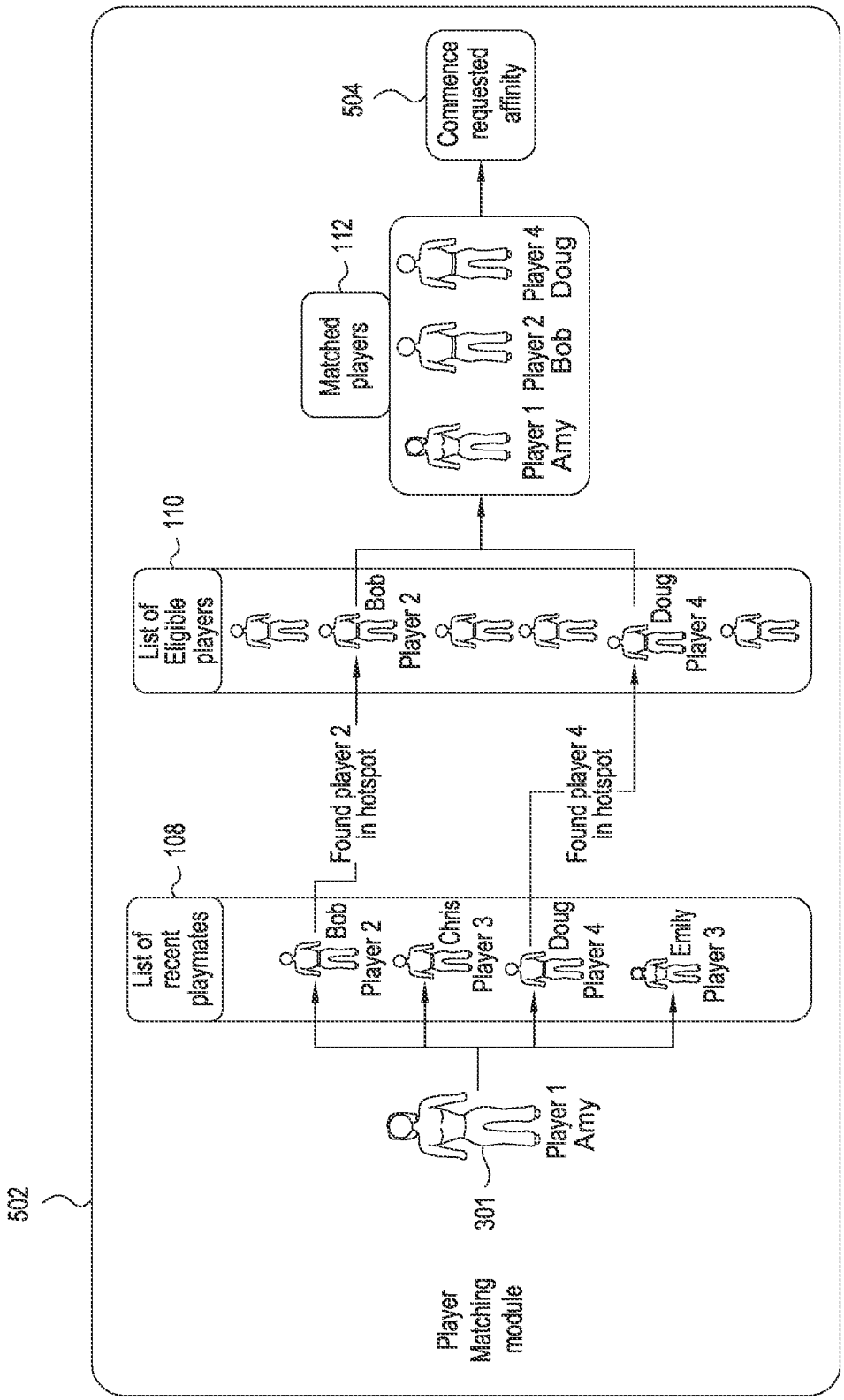

FIG. 5 is a diagram depicting determination of matched players for the requesting user, according to one embodiment presented in this disclosure.

Figure 6:
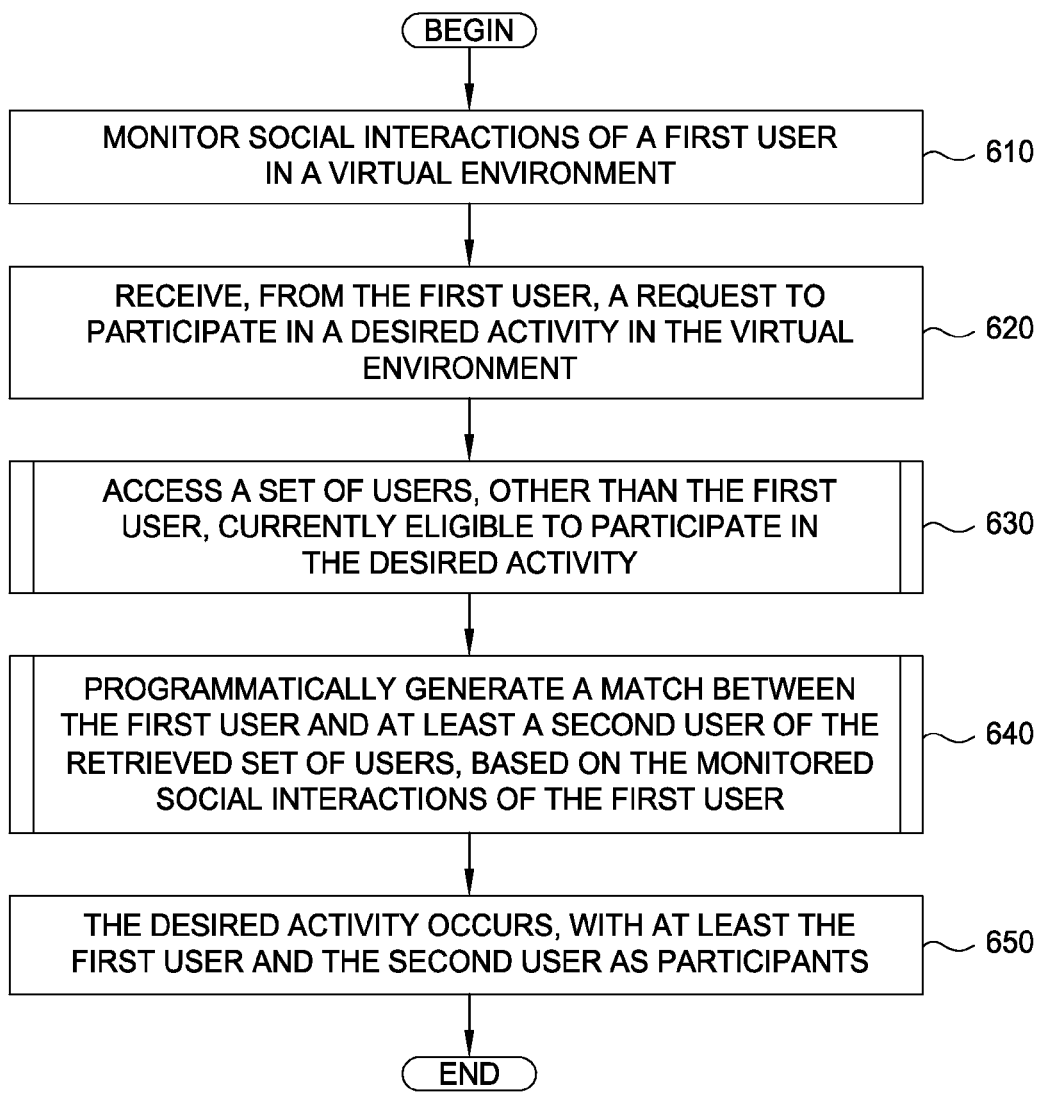

FIG. 6 is a flowchart depicting a method to facilitate player matching in the virtual environment, according to one embodiment presented in this disclosure.

Figure 7:
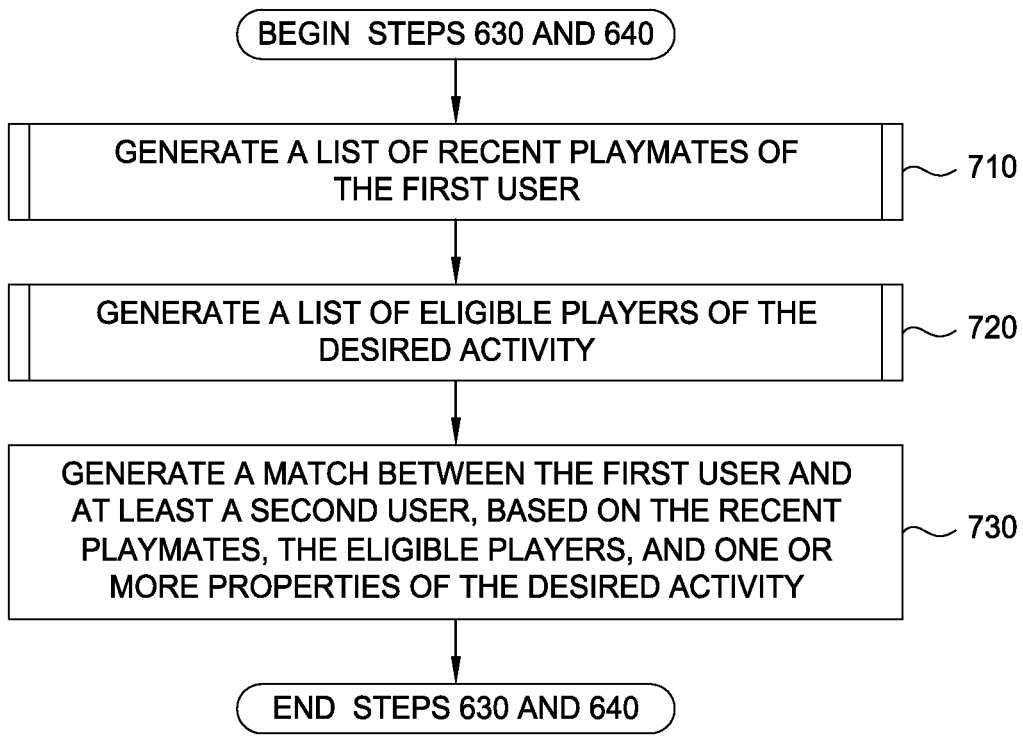

FIG. 7 is a flowchart depicting a method to generate matched players for the requesting user, according to one embodiment presented in this disclosure.

Figure 8:
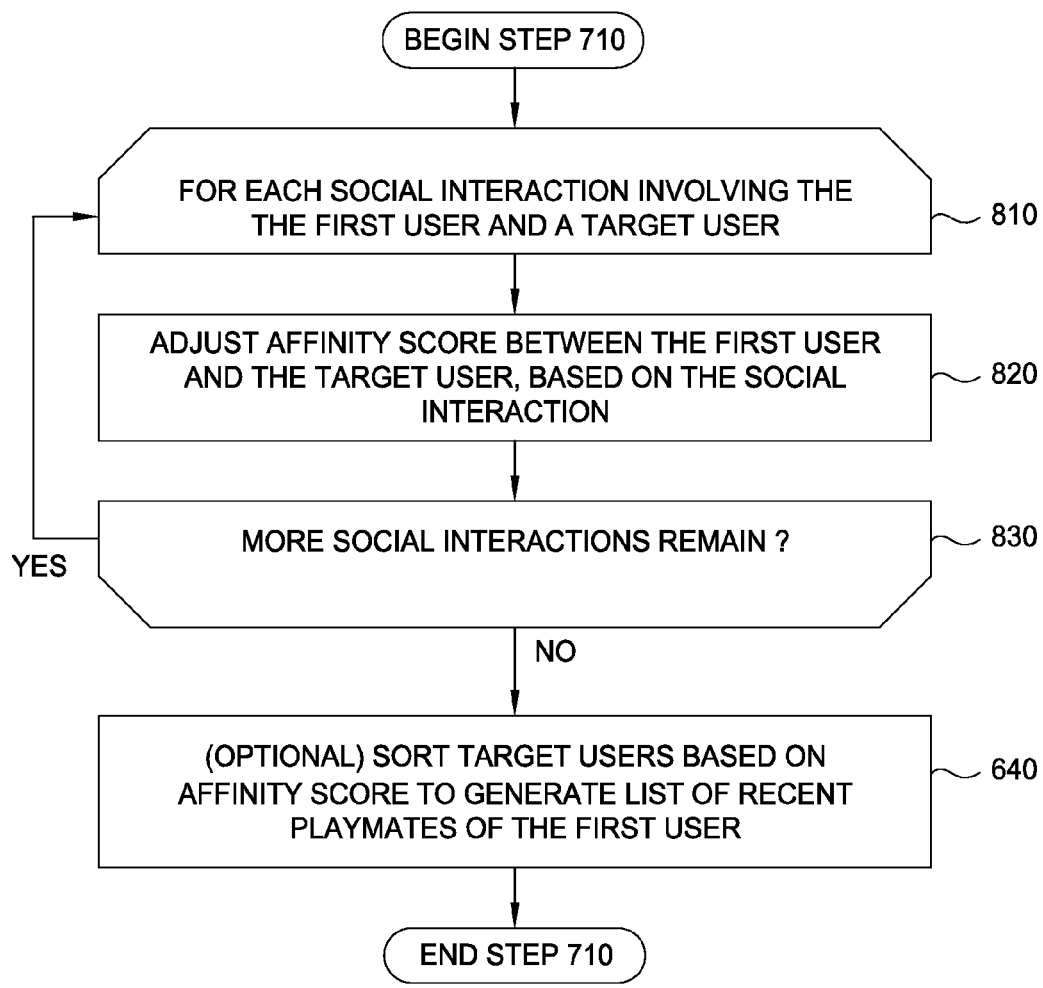

FIG. 8 is a flowchart depicting a method to determine recent playmates of the requesting user, according to one embodiment presented in this disclosure.

Figure 9:
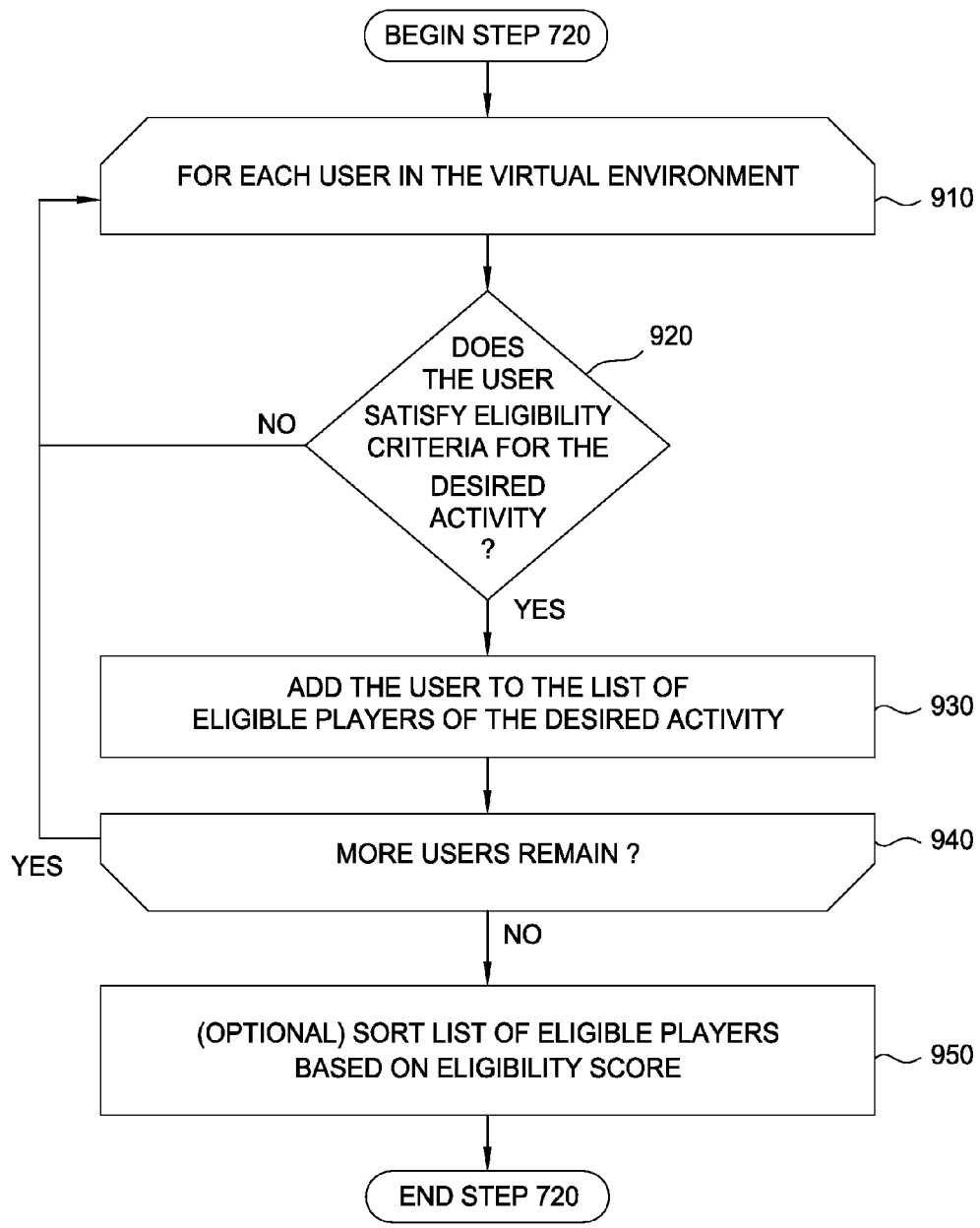

FIG. 9 is a flowchart depicting a method to determine eligible participants for a requested activity, according to one embodiment presented in this disclosure.

Figure 10:
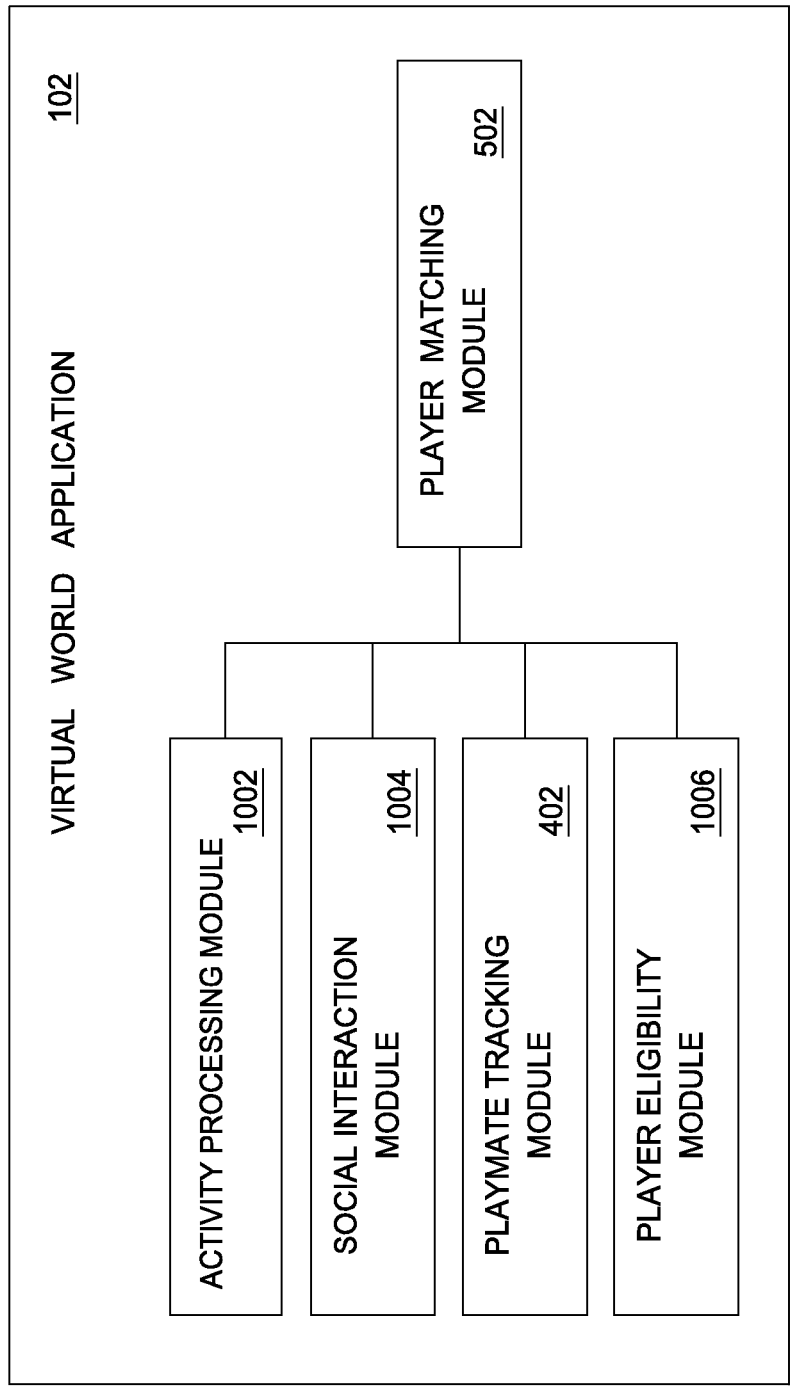

FIG. 10 is a block diagram illustrating components of a virtual world application, according to one embodiment presented in this disclosure.

Figure 11:
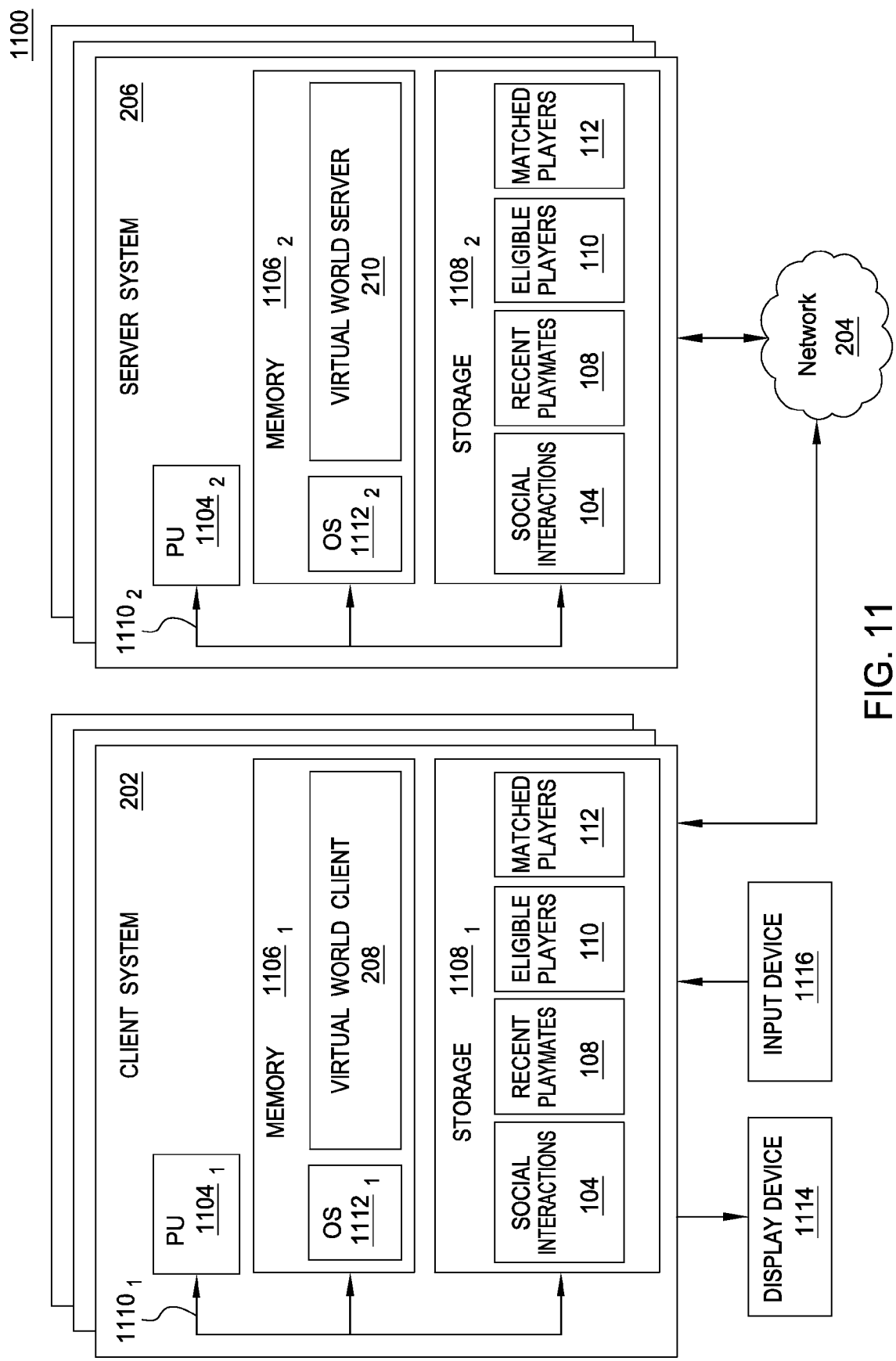

FIG. 11 is a block diagram illustrating a networked system configured to facilitate player matching in the virtual environment, according to one embodiment presented in this disclosure.

DETAILED DESCRIPTION

Matching players for group activities in a virtual environment may pose many challenges. For example, some players may prefer random player matching, other players may prefer matching based on player skill level, while still others may prefer matching based on still other criteria. In particular, younger players may often wish to play with other players they are interacting or have recently interacted within the virtual environment. Friend lists, also referred to as buddy lists, may indicate who a given player prefers to interact with, but friend lists do not necessarily indicate who the given player is interacting with at a given moment in time in the virtual environment. In some embodiments, a user interface may be provided to allow players manually specify a match or to specify criteria to be used for automatic player matching. However, such a user interface may often be too sophisticated for younger audiences to use on a regular basis. Further, players of certain demographics, including younger players, may often wish to be matched based on friendships or social interactions and to the exclusion of (or in addition to) player skill level or gaming interactions. The social interactions may range from explicit interactions, such as chatting frequency, to implicit interactions, such as "hanging out" in the virtual environment.

At least in some embodiments, interactions between users in a virtual environment are divided into gaming interactions and social interactions. In one embodiment, gaming interactions between users in a virtual environment refer to interactions between the users over the course of participating in a predefined gaming activity in the virtual environment. Social interactions between users in a virtual environment refer to interactions between the users while not participating in a predefined gaming activity in the virtual environment—e.g., while hanging out in a virtual chatroom or in a gaming lobby in the virtual environment. Although gaming activities may often allow users to socially interact over the course of the gaming activities, the techniques disclosed herein may be adapted to include or exclude such social interactions occurring during gaming activities, to suit the needs of a particular case. In alternative embodiments, an administrative user defines, for each gaming activity available in the virtual environment, what types of social interactions are considered or ignored for purposes of player matching in the virtual environment. And although embodiments are described herein with reference to player matching based on social interactions, in alternative embodiments, player matching may be based additionally on gaming interactions between users.

Embodiments presented in this disclosure provide techniques for user matching based on social interactions between users in a virtual environment. As used herein, user matching is also referred to as player matching. In one embodiment, social interactions of a first user are monitored in the virtual environment. A request is received from the first user, the request specifying to participate in a desired group activity in the virtual environment. A set of users, other than the first user, that are currently eligible to participate in the group activity is accessed. A match is programmatically generated between the first user and at least a second user of the accessed set of users, based on the monitored social interactions of the first user. The group activity then commences, with at least the first user and the second user as participants. Accordingly, users may enjoy improved player matching for activities in the virtual environment, at least relative to alternative approaches for player matching, such as random matching or skill-based matching. Doing so may improve the user experience and increase user satisfaction with the virtual environment at least in some cases.

FIG. 1 is a data flow diagram 100 illustrating an application configured to facilitate user matching in a virtual environment, according to one embodiment presented in this disclosure. As shown, the application is a virtual world application 102 configured to generate matched players 112 for a requested group activity 106 and based on social interactions 104. Depending on the embodiment, the virtual world application 102 may be a client application or a server application, as is further described below in conjunction with FIG. 2. At least in some embodiments, the matched players 112 may be generated based further on selection criteria 107, a list of recent playmates 108, and a list of eligible players 110. Depending on the embodiment, the list of recent playmates 108 and the list of eligible players 110 may be retrieved or generated by the virtual world application 102.

In one embodiment, the selection criteria specify how to select players for the list of recent players 108, the list of eligible players 110, or the matched players 112 for the group activity 106. The selection criteria 107 may be specified by an administrator or developer of the virtual world application 102. In some embodiments, the selection criteria include one or more of playmate criteria 114, eligibility criteria 116, and matching criteria 118. The playmate criteria 114 specify how to generate the list of recent playmates 108 based on the social interactions 104. For example, the playmate criteria 114 define what types of interactions to consider, how to weight each type of social interaction, what time period for which interactions may be considered, etc.

In one embodiment, the eligibility criteria 116 specify how to generate the list of eligible players 110 based on the requested group activity 106. Depending on the embodiment, the eligibility criteria 116 may be specific to the requested group activity 106. For example, the eligibility criteria 114 define one or more conditions required by the group activity 106. For instance, one condition may specify that the player must currently be at a predefined virtual location or predefined chatroom in the virtual environment, in order to be eligible to participate in the group activity 106. Conditions may also pertain to properties of an avatar (or a user thereof). For example, an avatar condition, also referred to herein as a character-specific condition, may specify that the avatar must be of a certain avatar level, have played a certain number of games, be of a certain avatar ranking, have a certain avatar level in a specified skill, be of a certain avatar character class or profession, have achieved certain objectives in the virtual environment such as successfully completing a mini-game, etc. A user condition, also referred to herein as an account-specific condition, may be specific to a user rather than to an avatar of the user. For example, a user condition may specify that the user has spent a certain number of hours playing in the virtual environment, playing a specified mini-game in the virtual environment, or performing a specified activity in the virtual environment, across all avatars of the user in the virtual environment.

In one embodiment, the matching criteria specify how to generate the matched players 112 for the group activity, based on the list of recent playmates 108 and the list of eligible players 110. For example, at least in some embodiments, the list of recent playmates 108 is ordered by affinity score, and the list of eligible players is ordered by eligibility score. In one embodiment, the affinity score between a first user and a given user characterizes a degree of social interaction between the first user and the given user—as determined by the playmate criteria 114. The eligibility score of a given user for a specified group activity characterizes an extent to which the given user is eligible to participate in the specified group activity—as determined by the eligibility criteria 116.

In some embodiments, the matching criteria 118 specify how to weight the affinity score and the eligibility score to generate the matched players 112 for the group activity. For example, the matching criteria 118 may specify to compute, for a given player, a matching score based on a predefined function of the affinity score and the eligibility score. The predefined function may assign different weights to the affinity score and the eligibility score, respectively. The predefined function may also be specific to a group activity, such that different group activities have different associated functions for computing matching scores. Once the matching scores are computed, the virtual world application 150 may select the players having the highest matching score, as the matched players 112 for the group activity.

FIG. 2 is a block diagram illustrating a networked system 200 configured to facilitate player matching in a virtual environment, according to one embodiment presented in this disclosure. As shown, the system 200 includes a plurality of client systems 202 connected to a plurality of server systems 206 via a network 204. As described above, depending on the embodiment, the virtual world application 102 may be one or more of a virtual world client 208, a virtual world server 210, or a standalone application 212 configured to generate matched players for the virtual world client 208 or the virtual world server 210. Depending on the embodiment, the standalone application 212 may execute on the client system 202, the server system 206, or any computer system operatively connected to the client system 202 or to the server system 206 via the network 205.

In one embodiment, each of the client systems 202 is configured to operate the virtual world client 208. Examples of the client systems 202 include, without limitation, console gaming systems (e.g., the Microsoft Xbox 360®, the Sony Playstation® 3, etc.), handheld gaming systems (e.g., the Nintendo 3DS™ and DST™, the Sony PSP®, etc.), personal computer gaming systems and so on. The server systems 206 are configured to operate the virtual world server 210. Generally, the virtual world server 210 is configured to receive connections from users (e.g., via the virtual world clients 208) and to manage a virtual environment and interactions between the users within the virtual environment. In one embodiment, the virtual environment is a virtual world. The virtual world client 208 or the virtual world server 210 may generate the matched players 112 for a group activity, based on the social interactions 104. Accordingly, player matching in a virtual environment may be improved at least in some cases.

FIG. 3 is a set diagram 300 representing matched players in a virtual environment, according to one embodiment presented in this disclosure. Assume that a first player, Amy, requests to participate in a racing game in the virtual environment. Amy is represented by an avatar 301 in the virtual environment. The set diagram 300 includes a region 303 representing all players of the virtual environment, other than Amy. The region 303 includes a first sub-region 302 representing players that Amy has recently socially interacted with in the virtual environment, also referred to herein as recent playmates of Amy. The region 303 further includes a second sub-region 304 representing players currently eligible to participate in the racing quest, also referred to herein as eligible players. Although the sub-regions 302, 304 are shown to be partially overlapping in this particular example, in other embodiments, the sub-regions 302, 304 may be fully overlapping or non-overlapping. The set diagram 300 further includes a subset 308 of a set intersection 306 between the sub-regions 302, 304. Assume that the racing game requested by Amy supports a maximum of ten concurrent players. The subset 308 would then include nine (or fewer) players selected from the set intersection 306, based on predefined matching criteria. The racing game may then commence, with Amy and the nine players as participants.

FIG. 4 is a diagram 400 depicting determination of recent playmates of a user, according to one embodiment presented in this disclosure. The recent playmates correspond to the sub-region 302 of FIG. 3. At least in some embodiments, the determination is made by a playmate tracking module 402 of the virtual world application 102, also referred to as a tracking module. In one embodiment, the playmate tracking module 402 generates a list of recent playmates 108 of Amy, based on the playmate criteria 114 and the social interactions 104. Depending on the embodiment, the list of recent playmates 108 may further include an affinity score between Amy and each playmate on the list 108.

In one embodiment, the playmate criteria 114 specify to increase the affinity score between Amy and a target avatar by one point each time Amy clicks on the target avatar within a predefined time period, e.g., by using a pointing device such as a mouse. The playmate criteria 114 further specify to increase the affinity score by one point each time Amy clicks to send an instant message to the target avatar via the virtual environment and within the predefined time period, also referred to herein as a session. The playmate criteria 114 further specify to increase the affinity score avatar by one point if Amy requests to add the target avatar to a buddy list of Amy within the virtual environment. The playmate criteria 114 further specify to increase the affinity score by three points the target avatar is successfully added to the buddy list of Amy. The playmate criteria 114 further specify to increase the affinity score by two points each time Amy is in range of the target avatar for more than ten seconds out of a thirty-second interval. Depending on the embodiment, the ten seconds may be continuous. The playmate criteria 114 may be tailored to suit the needs of a particular case.

As shown, the diagram 400 further includes social interactions 104 between Amy and other players in the virtual environment. For example, the social interactions 104 specify that Amy clicked on an avatar of Bob five times, sent Bob two instant messages, and hung out with Bob for one minute, and added Bob to the buddy list of Amy in the virtual environment. Accordingly, based on the playmate criteria 114, the playmate tracking module 402 generates an affinity score of eight between Amy and Bob. As another example, the social interactions 104 further specify that Amy clicked on an avatar of Chris four times, sent one instant message to Chris, hung out with Chris for thirty seconds, and added Chris to the buddy list of Amy in the virtual environment. Accordingly, based on the playmate criteria 114, the playmate tracking module 402 generates an affinity score of six between Amy and Chris.

As a further example, the social interactions 104 specify that Amy clicked on an avatar of Doug three times and sent Doug a buddy request. Accordingly, the playmate tracking module 402 generates an affinity score of five between Amy and Doug. Still further, the social interactions 104 specify that Amy clicked on an avatar of Emily two times and hung out with Emily for fifteen seconds. Accordingly, an affinity score of three is generated between Amy and Emily. The list of recent playmates 108 may then be sorted based on affinity score.

Depending on the embodiment, affinity scores may be unidirectional or bidirectional. Unidirectional affinity scores apply in one direction between two users and not necessarily in another direction. For example, the affinity score of Amy towards Bob may not necessarily be the same as the affinity score of Bob towards Amy. In some embodiments, a bidirectional affinity score, also referred to as a composite affinity score, may be generated based on the distinct unidirectional affinity scores between two users. The bidirectional affinity score may be used in play matching, either in conjunction with or in lieu of the unidirectional affinity scores.

In some embodiments, the virtual world application 102 further includes a lock-in function and a decay function. The lock-in function occurs when an affinity score reaches a predefined threshold, such as a score of twenty. Affinity scores that reach the predefined threshold are not subject to decay. Players having such an affinity score with one another may be regarded as exhibiting a strong pattern of social interactions and should be matched with one another where possible. Affinity scores that do not reach the predefined threshold decay based on the decay function, such as by one point per a predefined decay interval. Players having such an affinity score with one another may be regarded as exhibiting a weak to moderate pattern of social interactions and should not necessarily be matched with one another, depending on the affinity score. By including the lock-in function and the decay function, the virtual world application 102 may improve its ability to differentiate between good and bad candidates for player matching.

FIG. 5 is a diagram 500 depicting determination of matched players for a user, according to one embodiment presented in this disclosure. The matched players correspond to the subset 308 of FIG. 3. At least in some embodiments, the determination is made by a player matching module 502 of the virtual world application 102, also referred to as a matching module. In one embodiment, the player matching module 502 generates a list of matched players 112 for Amy, based on the list of recent playmates 108 and a list of eligible players 110. The list of eligible players 110 may be generated based on the eligibility criteria 116, such as user avatars being at a predefined location of the virtual environment at a time that a request is received from the user to engage in a desired group activity (e.g., being at a hotspot associated with the desired group activity). As specified above, in some embodiments, the eligibility criteria 116 may be specific to the group activity requested by the user. Accordingly, a developer or administrative user of the virtual environment may specify different eligibility criteria for different activities available in the virtual environment.

In one embodiment, the list of matched players 112 may be generated based on the matching criteria 118. For example, the list of matched players 112 may be generated by selecting players from a set intersection of the list of recent playmates 108 with the list of eligible players 110. The selected players may include players having the highest affinity score or eligibility score—i.e. in embodiments where player eligibility is expressed in terms of an eligibility score. In instances where the desired group activity specifies a minimum or maximum number of participants, the count of the selected players complies with the specified minimum or maximum. In still other embodiments, a skill compatibility score is generated between the user and each player, and the list of matched players 112 is generated based on the skill compatibility score, either in conjunction with or in lieu of the affinity score or the eligibility score. Once the list of matched players 112 is generated, the virtual world application 102 may commence the desired group activity, with the requesting user and the matched players as participants, as represented by element 504. In some embodiments, a predefined delay is introduced prior to matching players, to account for a time difference between a time of the request and a latency, in order to cast a wider net to capture more players in the list of recent playmates that are also eligible to participate in the requested activity.

In alternative embodiments, only one of list of recent playmates 108 and the list of eligible players 110 is generated. For example, in an embodiment where the list of recent playmates 108 is generated, the virtual world application 102 determines whether each player on the list of recent playmates 108 is eligible to participate in the requested activity. Alternatively, in an embodiment where the list of eligible players 110 is generated, the virtual world application 102 determines an affinity score between the requesting user and each player on the list of eligible players 110. By generating only one of the list of recent playmates 108 and the list of eligible players 110 as described herein, the virtual world application 102 may generate the list of matched players 112 more efficiently in some cases.

FIG. 6 is a flowchart depicting a method 600 to facilitate player matching in a virtual environment, according to one embodiment presented in this disclosure. As shown, the method 600 begins at step 610, where the virtual world application 102 monitors social interactions of a first user in the virtual environment. At step 620, the virtual world application 102 receives, from the first user, a request to participate in a desired activity in the virtual environment. At step 630, the virtual world application 120 generates or retrieves a set of users, other than the first user, currently eligible to participate in the desired activity. At step 640, the virtual world application 120 programmatically generates a match between the first user and at least a second user of the retrieved set of users, based on the monitored social interactions of the first user. The steps 630 and 640 are further described below in conjunction with FIG. 7. At step 650, the desired activity occurs in the virtual environment, with at least the first user and the second user as participants. After the step 650, the method 600 terminates.

FIG. 7 is a flowchart depicting a method 700 to generate matched players for a requesting user, according to one embodiment presented in this disclosure. The method 700 corresponds to the steps 630 and 640 of FIG. 6. As shown, the method 700 begins at step 710, where the virtual world application 102 generates a list of recent playmates of the requesting user. The step 710 is further described below in conjunction with FIG. 8. At step 720, the virtual world application 102 generates a list of eligible players of the desired activity. The step 720 is further described below in conjunction with FIG. 9. At step 730, the virtual world application 102 generates a list of matched players, including a match between the requesting user and at least the second user, based on the list of recent playmates, the list of eligible players, and one or more properties of the desired activity. The list of matched players corresponds to the subset 308 of FIG. 3. After the step 730, the method 700 terminates.

FIG. 8 is a flowchart depicting a method 800 to determine recent playmates of a requesting user, according to one embodiment presented in this disclosure. The method 800 corresponds to the step 710 of FIG. 7. As shown, the method 800 begins at step 810, where the virtual world application 102 enters a loop to process each social interaction involving the requesting user and a target user. At step 820, the virtual world application 102 adjusts the affinity score between the requesting user and the target user, based on the social interaction. At step 830, the virtual world application 102 determines whether any additional social interactions remain to be processed. If so, the virtual world application 102 returns to the step 810 to process a next social interaction involving the requesting user and the target user. Otherwise, at step 840, the virtual world application 102 sorts the target users based on affinity score, to generate a list of recent playmates of the requesting user. In an alternative embodiment, the list of recent playmates is generated without sorting the target users based on affinity score and remains unsorted. The list of recent playmates corresponds to the sub-region 302 of FIG. 3. After the step 840, the method 800 terminates.

FIG. 9 is a flowchart depicting a method 900 to determine eligible participants for a requested activity, according to one embodiment presented in this disclosure. The method 900 corresponds to the step 720 of FIG. 7. As shown, the method 900 begins at step 910, where the virtual world application 102 enters a loop to process each user in the virtual environment. At step 920, the virtual world application 102 determines whether the user satisfies eligibility criteria for the requested activity. If not, the virtual world application 102 returns to the step 910 to process a next user in the virtual environment. Otherwise, at step 930, the virtual world application 102 adds the user to a list of eligible players for the requested activity. At step 940, the virtual world application 102 determines whether any additional users remain to be processed. If so, the virtual world application 102 returns to the step 910 to process a next user in the virtual environment. Otherwise, at step 950, the virtual world application 102 sorts the list of eligible players based on eligibility score. In some embodiments, the list of eligibility players remains unsorted. The list of eligible players corresponds to the sub-region 304 of FIG. 3. After the step 950, the method 900 terminates.

FIG. 10 is a block diagram illustrating components 1000 of the virtual world application 102 of FIG. 1, according to one embodiment presented in this disclosure. As shown, the components 1000 include an activity processing module 1002, a social interaction module 1004, the playmate tracking module 402, a player eligibility module 1006, and the player matching module 502. Those skilled in the art will recognize that the components 1000 of the virtual world application 102 are merely exemplary, and other ways of implementing the virtual world application 102 are broadly contemplated in the present disclosure.

In one embodiment, the activity processing module 1002 is configured to receive a request from a user to participate in a desired activity. The activity processing module 1002 may also be configured to retrieve selection criteria associated with the desired activity. As described above, the selection criteria include playmate criteria, eligibility criteria, and matching criteria. The social interaction module is configured to monitor and log social interactions between users in the virtual environment. The playmate tracking module 402 is configured to generate and maintain a list of recent playmates based on the monitored social interactions and the playmate criteria. The player eligibility module 1006 is configured to generate and maintain a list of eligible players based on the eligibility criteria specific to the desired activity. The player matching module 502 is configured to generate a list of matched players for the requesting user, based on the list of recent playmates, the list of eligible players, and the matching criteria.

Embodiments disclosed herein present techniques for facilitating player matching in a virtual environment. In one embodiment, a virtual world application is provided that determines a list of matched players for a user requesting to participate in a desired group activity. The list of matched players may be generated based on a list of recent playmates of the user and a list of eligible players for the group activity. Accordingly, users may enjoy improved player matching in group activities in the virtual environment, at least relative to alternative approaches to player matching such as skill-based matching, random matching, and manual inviting. User satisfaction with the virtual environment may also be improved as a result.

FIG. 11 is a block diagram illustrating a networked system 1100 configured to facilitate player matching in a virtual environment, according to one embodiment presented in this disclosure. The networked system 1100 corresponds to the networked system 200 of FIG. 2. As shown, the system 1100 includes a plurality of client systems 202 and a plurality of server systems 206, communicatively coupled via the network 204.

In one embodiment, the client systems 202 may include existing computer systems, e.g., desktop computers, server computers, laptop computers, tablet computers, gaming consoles, hand-held gaming devices and the like. The client systems 202 illustrated in FIG. 11, however, are merely examples of computer systems in which embodiments disclosed herein may be used. Embodiments disclosed herein may be implemented differently, regardless of whether the computer systems are complex multi-user computing systems, such as a cluster of individual computers connected by a high-speed network, single-user workstations, or network appliances lacking non-volatile storage. Moreover, it is explicitly contemplated that embodiments disclosed herein may be implemented using any device or computer system capable of performing the functions described herein.

As shown, each client system 202 and server system 206 includes, without limitation, a processor 1104, which obtains instructions and data via a bus 1110 from a memory 1106 and storage 1108. The processor 1104 is a programmable logic device that performs instruction, logic, and mathematical processing, and may be representative of one or more CPUs. The memory 1106 is any memory sufficiently large to hold the necessary programs and data structures. The memory 1106 could be one or a combination of memory devices, including Random Access Memory, nonvolatile or backup memory (e.g., programmable or Flash memories, read-only memories, etc.).

As shown, the memory 1106 includes an operating system ("OS") 1112. Operating system 1112 is software used for managing the operation of the client system 202 or the server system 206. Examples of the OS 1112 include UNIX, versions of the Microsoft Windows® operating system and distributions of the Linux® operating system. Additional examples of the OS 1112 include custom operating systems for gaming consoles, including the custom operating systems for systems such as the Microsoft Xbox 360®, Nintendo WHO and Sony PlayStation® 3. As shown, the memory $1106_1$ of the client system 202 further includes the virtual world client 208. The memory $1106_2$ of the server system 206 further includes the virtual world server 210.

The storage 1108 is representative of hard-disk drives, flash memory devices, optical media and the like. Generally, the storage 1108 stores application programs and data for use by the client systems 202. In addition, the memory 1106 and the storage 1108 may be considered to include memory physically located elsewhere; for example, on another computer coupled to the client system 202 or to the server system 206 via the bus 1110. The client systems 202 and the server systems 206 are operably connected to the network 204, e.g., via network interfaces. As shown, the social interactions 104, the recent playmates 108, the eligible players 110, and the matched players 112 may be included in the storage $1108_1$ of the client system or the storage $1108_2$ of the server system 206.

Additionally, the client systems 202 each are coupled to display devices 1114 and input devices 1116, respectively. The display devices 1114 may include output devices such as monitors, touch screen displays, and so on. For instance, the display devices 1114 may include a display device used to visually depict a virtual environment. As an example, the display 1114 may provide a touch sensitive surface allowing the user to select different locations within the virtual environment and control the movement of an avatar within the virtual environment. The input devices 1116 represent a wide variety of input devices, including keyboards, mice, controllers, and so on. Furthermore, the input devices 1116 may include a set of buttons, switches or other physical device mechanisms for controlling the client system 202. For example, the input devices 1116 could include a set of directional buttons used to navigate an avatar through a virtual environment presented on the display 1114.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects presented in this disclosure may be embodied as a system, method or computer program product. Accordingly, aspects disclosed herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects disclosed herein may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects disclosed herein may be written in any combination of one or more programming languages, including an object oriented programming language such as Java, Smalltalk, C++ or the like and conventional procedural programming languages, such as the "C" programming language or similar programming languages. The program code may execute entirely on the computer of a user, partly on the computer of the user, as a stand-alone software package, partly on the computer of the user and partly on a remote computer, or entirely on the remote computer or server. In the latter scenario, the remote computer may be connected to the computer of the user via any type of network, including a local area network (LAN) or a wide area network (WAN), or the connection may be made to an external computer (for example, through the Internet using an Internet Service Provider).

Aspects presented in this disclosure are described above with reference to flowchart illustrations or block diagrams of methods, apparatus (systems) and computer program products according to embodiments disclosed herein. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart or block diagram block or blocks.

Embodiments disclosed herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications (e.g., the virtual world server 210) or related data available in the cloud. For example, the virtual world server 210 could execute on a computing system in the cloud and receive a request to participate in a group activity, from a user (e.g., from the virtual world client 208 associated with the user). In such a case, the virtual world client 208 or the virtual world server 210 could generate a list of matched players for the user, to improve the experience of the user in the virtual environment.

The flowchart and block diagrams in the Figures illustrate the architecture, functionality, and operation of possible implementations of systems, methods and computer program products according to various embodiments disclosed herein. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams or flowchart illustration, and combinations of blocks in the block diagrams or flowchart illustration, can be implemented by special-purpose hardware-based systems that perform the specified functions or acts, or combinations of special purpose hardware and computer instructions.

While the foregoing is directed to embodiments presented in this disclosure, other and further embodiments may be devised without departing from the basic scope of contemplated embodiments, and the scope thereof is determined by the claims that follow.

What is claimed is:

1. A computer-implemented method of user matching based on social interactions in a virtual environment, the computer-implemented method comprising:
   monitoring social interactions of a first user in the virtual environment;
   receiving, from the first user, a request to participate in a first desired activity in the virtual environment;
   accessing a set of users, other than the first user, currently eligible to participate in the first desired activity; and
   programmatically generating, by operation of one or more computer processors, a match between the first user and at least a second user of the accessed set of users, based on the monitored social interactions of the first user, including determining a set intersection between the accessed set of users and a generated set of users with whom the first user has socially interacted with in the virtual environment, wherein the second user is selected from the set intersection;
   whereafter the first user and the second user participate in the first desired activity in the virtual environment based on the generated match.

2. The computer-implemented method of claim 1, wherein the match is generated responsive to the request and not based on any user skill level and not based on any user input specifying one or more preferred users with which to be matched for the first desired activity, wherein the second user is different from the first user.

3. The computer-implemented method of claim 2, wherein each user in the set of users satisfies a set of eligibility criteria specific to the first desired activity, wherein the set of eligibility criteria is not specific to a second desired activity different from the first desired activity, wherein the set of eligibility criteria includes requesting, within a predefined period of time, to participate in the first desired activity.

4. The computer-implemented method of claim 3, wherein each user in the set intersection and in the accessed set of users has an associated affinity score with the first user, wherein the second user is selected from the set intersection based on the second user having a highest affinity score with the first user, wherein the affinity score is determined based on a set of affinity scoring rules, wherein the set of affinity scoring rules specify that the affinity score of a given user with the first user is determined by a predefined function of: (i) a plurality of types of social interaction between the given user and the first user and (ii) a respective count of instances each type of social interaction between the given user and the first user;
   wherein the predefined function includes an associated weight for each of the plurality of types of social interaction, wherein the associated weights for at least two of the plurality of types of social interaction are distinct.

5. The computer-implemented method of claim 4, wherein each user has a respective avatar in the virtual environment, wherein each avatar is distinct, wherein the plurality of types of social interaction between the given user and the first user includes:
   (i) a first type of social interaction comprising the first user selecting an avatar of the given user, the first type of social interaction having a first associated weight;
   (ii) a second type of social interaction comprising the first user sending a communication to the avatar of the given user, the second type of social interaction having a second associated weight;
   (iii) a third type of social interaction comprising the first user requesting to add the given user to a friend list of the first user, the third type of social interaction having a third associated weight;
   (iv) a fourth type of social interaction comprising the avatar of the first user being within a predefined range of the avatar of the given user in the virtual environment, for at least a first predefined period of time, the fourth type of social interaction having a fourth associated weight, wherein each instance of the fourth type of social interaction is spaced apart by at least a second predefined period of time; and
   (v) a fifth type of social interaction comprising the given user being on the friend list of the first user, the fifth type of social interaction having a fifth associated weight.

6. The computer-implemented method of claim 5, wherein the fifth associated weight is higher than the fourth associated weight, wherein the fourth associated weight is higher than the first associated weight, the second associated weight, and the third associated weight;
   wherein the predefined function specifies to determine the affinity score for the given individual based on a weighted sum of counts of instances of each of the plurality of types of social interaction between the first individual and the given individual;
   wherein the predefined function further specifies to decay a given component of the affinity score for the given individual based on a set of decaying rules, the component pertaining to the fourth type of social interaction, wherein the set of decaying rules specifies to decay the given component by a specified amount each time a specified time period elapses in which the first user does not interact with the given user, wherein the specified amount is lower than the fourth associated weight.

7. The computer-implemented method of claim 6, wherein the first desired activity comprises a group activity, wherein the set of eligibility criteria further includes being at a predefined location of the virtual environment;
   wherein the match is generated by a virtual world application comprising an activity processing module, a social interaction module, a playmate tracking module, a player eligibility module, and a player matching module;

wherein social interaction module is configured to monitor the social interactions of the first user in the virtual environment;

wherein the playmate tracking module is configured to determine the affinity score for each user with which the first user interacts in the virtual environment, based on the set of affinity scoring rules;

wherein the player eligibility module is configured to determine the set of users, currently eligible to participate in the first desired activity, based on the set of eligibility criteria;

wherein the player matching module is configured to programmatically generate the match between the first user and at least the second user, based on the monitored social interactions of the first user; and wherein the activity processing module is configured to: (i) receive the request to participate in the first desired activity; (ii) retrieve criteria associated with the first desired activity; and (iii) initiate the first desired activity for participation by the first user and at least the second user.

8. The computer-implemented method of claim 1, wherein each user in the set of users satisfies a set of eligibility criteria specific to the first desired activity.

9. The computer-implemented method of claim 8, wherein the first desired activity comprises a group activity, wherein the set of eligibility criteria further includes being at a predefined location of the virtual environment.

10. The computer-implemented method of claim 1, wherein each user in the set intersection and in the accessed set of users has an associated affinity score with the first user, wherein the second user is selected from the set intersection based on the second user having a highest affinity score with the first user.

11. A non-transitory computer-readable medium containing a program, which when executed, is configured to perform an operation of user matching based on social interactions in a virtual environment, the operation comprising:

monitoring social interactions of a first user in the virtual environment;

receiving, from the first user, a request to participate in a first desired activity in the virtual environment;

accessing a set of users, other than the first user, currently eligible to participate in the first desired activity; and programmatically generating, by operation of one or more computer processors when executing the program, a match between the first user and at least a second user of the accessed set of users, based on the monitored social interactions of the first user, including determining a set intersection between the accessed set of users and a generated set of users with whom the first user has socially interacted with in the virtual environment, wherein the second user is selected from the set intersection;

whereafter the first user and the second user participate in the first desired activity in the virtual environment based on the generated match.

12. The non-transitory computer-readable medium of claim 11, wherein the match is generated responsive to the request and not based on any user skill level and not based on any user input specifying one or more preferred users with which to be matched for the first desired activity, wherein the second user is different from the first user.

13. The non-transitory computer-readable medium of claim 11, wherein each user in the set of users satisfies a set of eligibility criteria specific to the first desired activity.

14. The non-transitory computer-readable medium of claim 13, wherein the first desired activity comprises a group activity, wherein the set of eligibility criteria further includes being at a predefined location of the virtual environment.

15. The non-transitory computer-readable medium of claim 11, wherein each user in the set intersection and in the accessed set of users has an associated affinity score with the first user, wherein the second user is selected from the set intersection based on the second user having a highest affinity score with the first user.

16. A system of user matching based on social interactions in a virtual environment, the system comprising:

one or more computer processors;

a memory containing a program, which when executed by the one or more computer processors, is configured to perform an operation comprising:

monitoring social interactions of a first user in the virtual environment;

receiving, from the first user, a request to participate in a first desired activity in the virtual environment;

accessing a set of users, other than the first user, currently eligible to participate in the first desired activity; and programmatically generating a match between the first user and at least a second user of the accessed set of users, based on the monitored social interactions of the first user, including determining a set intersection between the accessed set of users and a generated set of users with whom the first user has socially interacted with in the virtual environment, wherein the second user is selected from the set intersection;

whereafter the first user and the second user participate in the first desired activity in the virtual environment based on the generated match.

17. The system of claim 16, wherein the match is generated responsive to the request and not based on any user skill level and not based on any user input specifying one or more preferred users with which to be matched for the first desired activity, wherein the second user is different from the first user.

18. The system of claim 16, wherein each user in the set of users satisfies a set of eligibility criteria specific to the first desired activity.

19. The system of claim 18, wherein the first desired activity comprises a group activity, wherein the set of eligibility criteria further includes being at a predefined location of the virtual environment.

20. The system of claim 16, wherein each user in the set intersection and in the accessed set of users has an associated affinity score with the first user, wherein the second user is selected from the set intersection based on the second user having a highest affinity score with the first user.

* * * * *

UNITED STATES PATENT AND TRADEMARK OFFICE
CERTIFICATE OF CORRECTION

| | | |
|---|---|---|
| PATENT NO. | : 9,021,369 B2 | Page 1 of 1 |
| APPLICATION NO. | : 13/736436 | |
| DATED | : April 28, 2015 | |
| INVENTOR(S) | : Crocker et al. | |

It is certified that error appears in the above-identified patent and that said Letters Patent is hereby corrected as shown below:

In the Specification

Column 5, Line 14, please delete "DST™" and insert --DS™-- therefor;

Column 10, Line 26, please delete "WHO" and insert --Wii®-- therefor.

Signed and Sealed this
Twenty-ninth Day of September, 2015

Michelle K. Lee
*Director of the United States Patent and Trademark Office*